United States Patent
Hohl

(10) Patent No.: US 10,982,526 B2
(45) Date of Patent: Apr. 20, 2021

(54) ESTIMATION OF MAXIMUM LOAD AMPLITUDES IN DRILLING SYSTEMS INDEPENDENT OF SENSOR POSITION

(71) Applicant: Andreas Hohl, Hannover (DE)

(72) Inventor: Andreas Hohl, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 133 days.

(21) Appl. No.: 16/408,688

(22) Filed: May 10, 2019

(65) Prior Publication Data

US 2019/0360320 A1 Nov. 28, 2019

Related U.S. Application Data

(60) Provisional application No. 62/674,660, filed on May 22, 2018.

(51) Int. Cl.
| | | |
|---|---|---|
| *E21B 44/02* | (2006.01) | |
| *G01L 5/10* | (2020.01) | |
| *E21B 21/08* | (2006.01) | |
| *E21B 47/00* | (2012.01) | |

(52) U.S. Cl.
CPC ............ *E21B 44/02* (2013.01); *E21B 21/08* (2013.01); *E21B 47/00* (2013.01); *G01L 5/10* (2013.01)

(58) Field of Classification Search
CPC .......... E21B 44/02; E21B 21/08; E21B 47/00; E21B 44/04; G01L 5/10
See application file for complete search history.

(56) References Cited

U.S. PATENT DOCUMENTS

| | | | |
|---|---|---|---|
| 9,004,195 B2 | 4/2015 | Regener et al. | |
| 2011/0186353 A1* | 8/2011 | Turner | G01H 1/003 |
| | | | 175/40 |
| 2012/0222900 A1* | 9/2012 | Rodney | G01V 3/08 |
| | | | 175/56 |
| 2013/0025851 A1* | 1/2013 | Laing | E21B 44/00 |
| | | | 166/250.01 |

(Continued)

FOREIGN PATENT DOCUMENTS

JP 2016505742 A 2/2016

OTHER PUBLICATIONS

Hohl, et al. "Prediction and Mitigation of Torsional Vibrations in Drilling Systems." IADC/SPE Drilling Conference and Exhibition, Society of Petroleum Engineers, 2016; 14 pages.

(Continued)

*Primary Examiner* — Brad Harcourt
(74) *Attorney, Agent, or Firm* — Cantor Colburn LLP

(57) ABSTRACT

Systems and methods for mitigating vibration in downhole strings are described. The methods include obtaining first and second load measurements of first and second loads during a drilling operation and creating first and second load measurement data, with first and second load sensors separated by a sensor distance. First and/or second representative values of the first and second loads are determined form the first and second load measurement data and the sensor distance. The determined representative value(s) are compared against respective load limit(s) and a vibration mitigation operation is performed in response to the determined representative value(s) equaling or exceeding the respective load limit.

20 Claims, 7 Drawing Sheets

(56) References Cited

U.S. PATENT DOCUMENTS

2015/0122547 A1   5/2015   Hohl et al.
2015/0322766 A1   11/2015  Veltman
2016/0348493 A1   12/2016  Hohl
2017/0268324 A1   9/2017   Moore
2018/0023355 A1   1/2018   Teodorescu et al.

OTHER PUBLICATIONS

Hohl, et al.; "Prediction and Mitigation of Torsional Vibrations in Drilling Systems"; IADC/SPE-178874-MS; Mar. 2016, IADC/SPE Drilling Conference and Exhibition; 15 pages.
International Search Report, International Application No. PCT/US2019/033498, dated Sep. 17, 2019, Korean Intellectual Property Office; International Search Report 3 pages.
International Written Opinion, International Application No. PCT/US2019/033498, dated Sep. 17, 2019, Korean Intellectual Property Office; International Written Opinion 6 pages.
Kyllingstad, et al. "A New Stick-Slip Prevention System", SPE/IADC Drilling Conference and Exhibition held in Amsterdam, The Netherlands, Mar. 17-19, 2009; 14 pages.

* cited by examiner

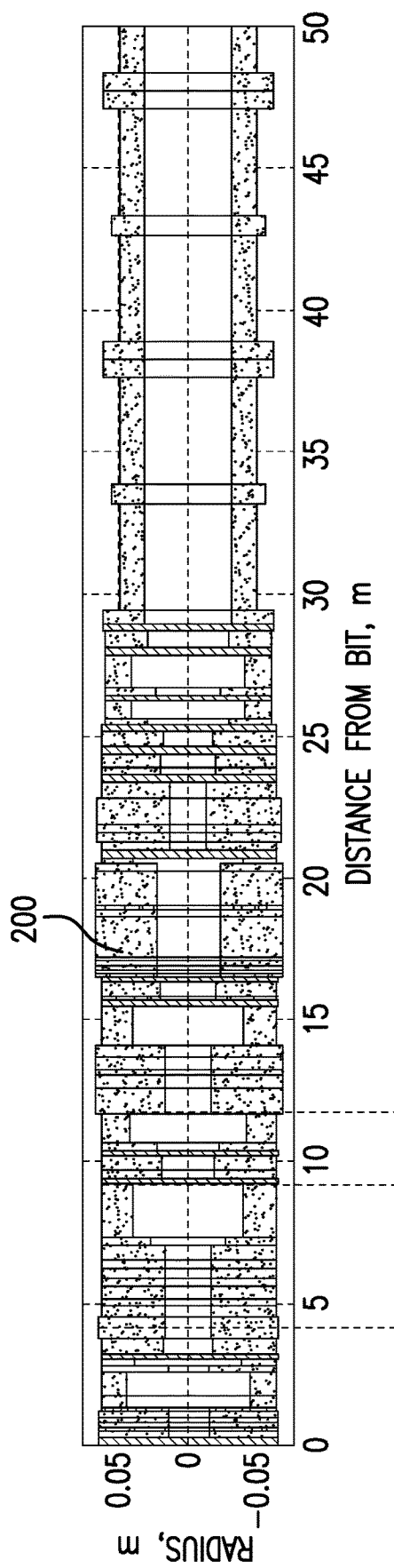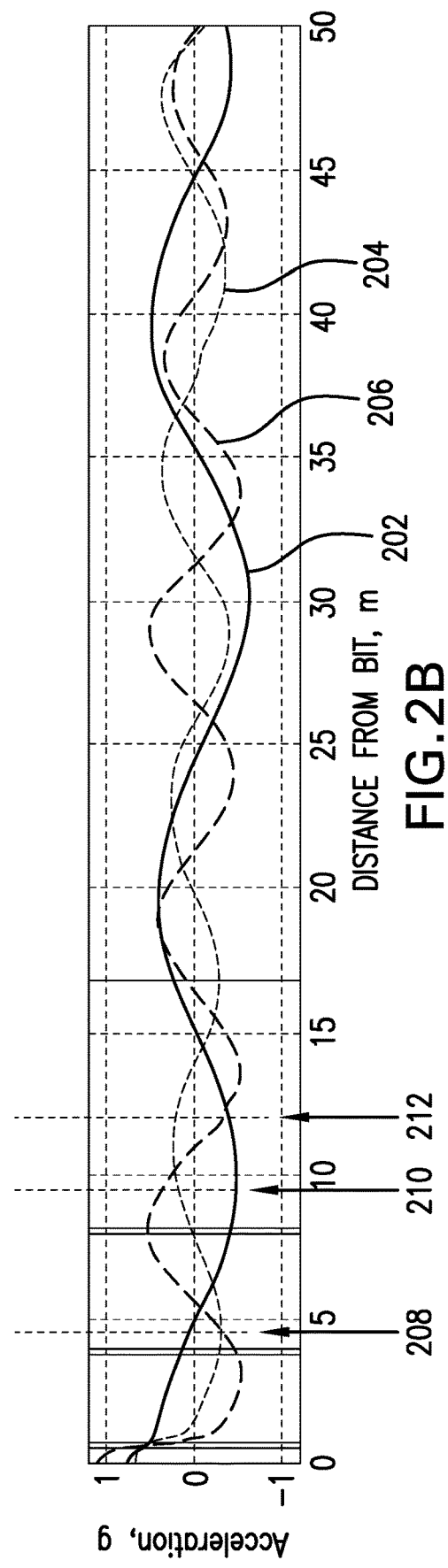
FIG.2A
FIG.2B

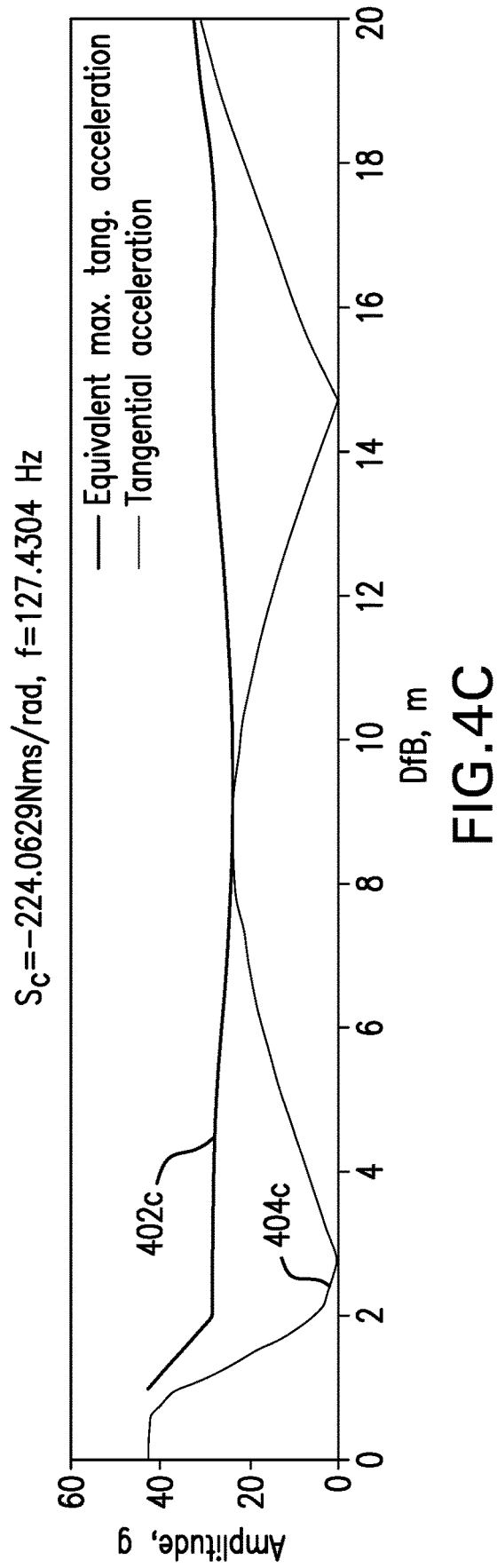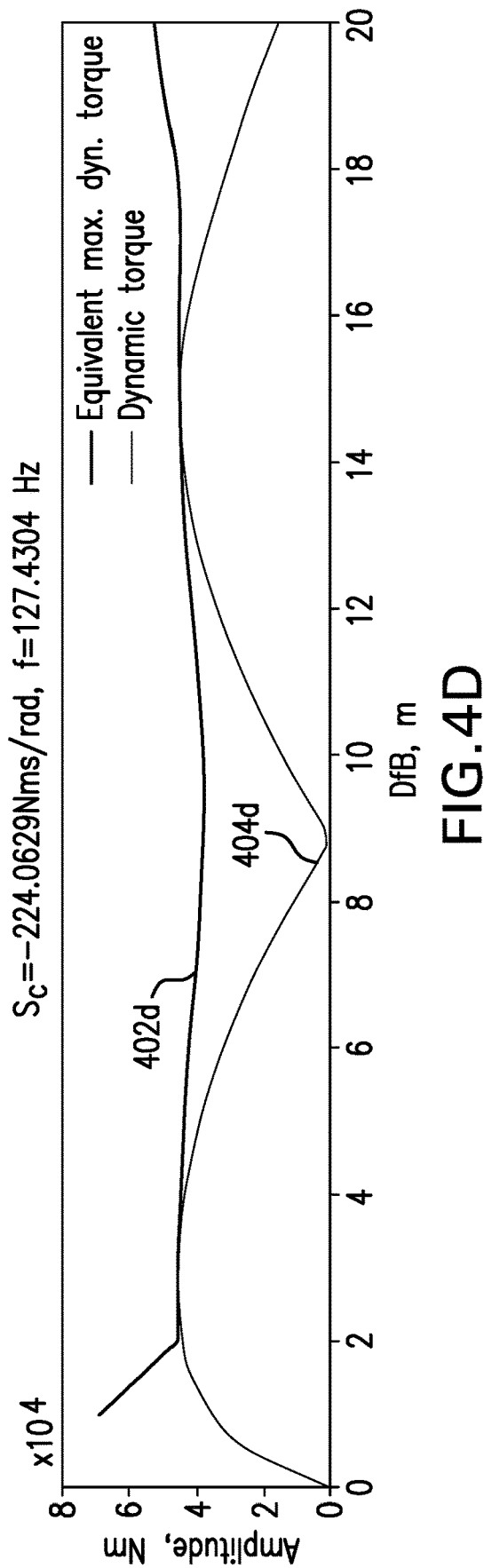

ESTIMATION OF MAXIMUM LOAD AMPLITUDES IN DRILLING SYSTEMS INDEPENDENT OF SENSOR POSITION

CROSS REFERENCE TO RELATED APPLICATIONS

This application claims the benefit of an earlier filing date from U.S. Provisional Application Ser. No. 62/674,660, filed May 22, 2018, the entire disclosure of which is incorporated herein by reference.

BACKGROUND

1. Field of the Invention

The present invention generally relates to subsurface operations and more particularly to estimation of maximum load amplitudes during drilling operations that is independent of sensor position.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to energy or a material (e.g., heat, a gas, or fluid) contained in a formation located below the earth's surface. Different types of tools and instruments may be disposed in the boreholes to perform various tasks and measurements.

During drilling operations, severe vibrations in drill strings and bottomhole assemblies can be caused by cutting forces at the bit or mass imbalances in downhole tools such as mud motors. Such vibrations can result in reduced rates of penetration, reduced quality of measurements, and, potentially, downhole failures. As such, it is important to determine and operate using drilling parameters (e.g., string RPM, bit RPM, WOB, etc.) that reduce and/or mitigate vibrations.

During drilling operations, adjustment of the drilling parameters may be based on objective criteria that represents the downhole vibration level. The objective criteria are needed at the surface to help a driller (e.g., operator) to adjust the drilling parameters. Measurements from accelerometers or other downhole sensors are typically used for this purpose. However, the interpretation of this data is limited due to several reasons. For example, the various downhole measurements are dependent on the position of the sensor(s) located downhole. Further, when using accelerometers, tangential accelerations and radial accelerations are proportional to the radius, and thus an interpretation of data therefrom can lead only to reasonable results if the field personnel are aware of the interdependencies and the sensor position. Moreover, distance from bit of the sensor can impact obtained information. For example, the amplitudes associated to different vibration mode or modes that are excited may be based on the distance from bit of the sensor position which in turn influences the measurement. That is, the measurements are strongly dependent on the vibration mode shape or mode shapes that are excited. For example, in a node of a mode shape no amplitude is measured (not observable) and vice versa. Moreover, filter characteristics and sampling rates can limit the frequencies that contribute to the overall vibration amplitude level. Additionally, as will be appreciated by those of skill in the art, the sensor positions are not perfectly aligned and/or the position tolerances of the sensors may be too high. Therefore, the separation of lateral, radial, and tangential acceleration (vibration) may not be accurate. Accordingly, improved means for determining and/or estimating downhole vibrations may be advantageous.

SUMMARY

Disclosed herein are systems and methods for mitigating vibration in downhole strings. The systems and methods include obtaining first and second load measurements of first and second loads during a drilling operation and creating first and second load measurement data, with first and second load sensors separated by a sensor distance. First and/or second representative values of the first and second loads are determined form the first and second load measurement data and the sensor distance. The determined representative value(s) are compared against respective load limit(s) and a vibration mitigation operation is performed in response to the determined representative value(s) equaling or exceeding the respective load limit.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 2A is a schematic illustration of a downhole system illustrating a shape of the downhole system as a function of distance-from-bit;

FIG. 2B illustrates example corresponding torsional acceleration mode shapes that may be excited during operation of the downhole system of FIG. 2A;

FIG. 4C is a schematic plot illustrating a comparison between the analytical analysis in accordance with an embodiment of the present and an actual acceleration measurement;

FIG. 4D is a schematic plot illustrating a comparison between the analytical analysis in accordance with an embodiment of the present and an actual torque measurement;

DETAILED DESCRIPTION

Figure 1:
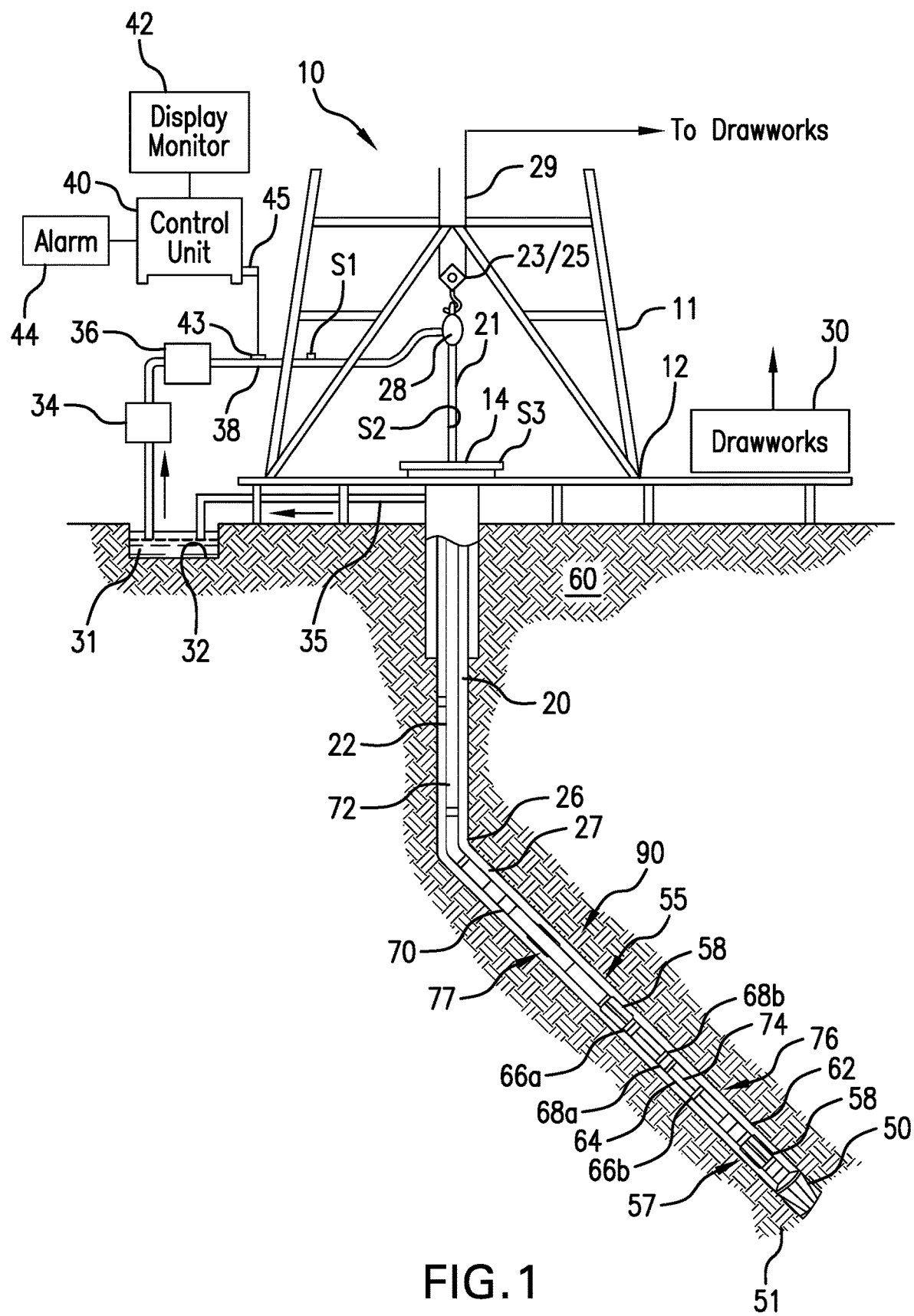
FIG. 1 is an example of a system for performing subsurface operations that can employ embodiments of the present disclosure.

FIG. 1 shows a schematic diagram of a system for performing subsurface operations (e.g., downhole, within the earth or below other surface and into a formation). As shown, the system is a drilling system 10 that includes a drill string 20 having a drilling assembly 90, also referred to as a bottomhole assembly (BHA), conveyed in a borehole or borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating tool 50, such as a drill bit attached to the end of the drilling assembly 90, disintegrates the geological formations when it is rotated to drill the borehole 26. The drill string 20 is coupled to a drawworks 30 via a kelly joint 21, swivel 28, traveling block 25, and line 29 through a pulley 23. During the drilling operations, the drawworks 30 is operated to control the weight-on-bit (WOB), which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the inner bore of the drill string 20 via a desurger 36, fluid line 38 and the kelly joint 21. Fluid line 38 may also be referred to as a mud supply line. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the fluid line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the drilling assembly 90.

In some applications the disintegrating tool 50 is rotated by rotating the drilling tubular 22. However, in other applications, a drilling motor 55 (such as a mud motor) disposed in the drilling assembly 90 is used to rotate the disintegrating tool 50 and/or to superimpose or supplement the rotation of the drill string 20 (rotary mode). In either case, the rate of penetration (ROP) of the disintegrating tool 50 into the earth formation 60 for a given formation and a drilling assembly largely depends upon the weight-on-bit and the rotational speed of the disintegrating tool 50. In one aspect of the embodiment of FIG. 1, the drilling motor 55 is coupled to the disintegrating tool 50 via a drive shaft (not shown) disposed in a bearing assembly 57. If a mud motor is employed as the drilling motor 55, the mud motor rotates the disintegrating tool 50 when the drilling fluid 31 passes through the drilling motor 55 under pressure. The bearing assembly 57 supports the radial and axial forces of the disintegrating tool 50, the downthrust of the drilling motor and the reactive upward loading from the applied weight-on-bit. Stabilizers 58 coupled to the bearing assembly 57 and at other suitable locations on the drill string 20 act as centralizers, for example for the lowermost portion of the drilling motor assembly and other such suitable locations. The drilling motor 55 may include an Adjustable Kick Off sub (AKO). The deployment of an AKO provides the build of inclination of the borehole when drilling in a sliding mode (i.e., no drill string rotation and the disintegrating device is only drive by the rotor of the drilling motor). Alternatively, a deviated borehole may be drilled by using a deflection device, such as a steering unit or device (not shown), that enables an operator to steer the disintegrating device (e.g., drill bit) in a desired direction. A steering unit comprises one or more force application devices that may be actuated and controlled hydraulically, electrically, or both.

A surface control unit 40 receives signals from the downhole sensors 70 and devices via a sensor 43 placed in the fluid line 38 as well as from sensors S1, S2, S3, hook load sensors, sensors to determine the height of the traveling block (block height sensors), and any other sensors used in the system and processes such signals according to programmed instructions provided to the surface control unit 40. For example, a surface depth tracking system may be used that utilizes the block height measurement to determine a length of the borehole (also referred to as measured depth of the borehole) or the distance along the borehole from a reference point at the surface to a predefined location on the drill string 20, such as the disintegrating tool 50 or any other suitable location on the drill string 20 (also referred to as measured depth of that location, e.g. measured depth of the disintegrating tool 50). Determination of measured depth at a specific time may be accomplished by adding the measured block height to the sum of the lengths of all equipment that is already within the wellbore at the time of the block-height measurement, such as, but not limited to drilling tubulars 22, drilling assembly 90, and disintegrating tool 50. Depth correction algorithms may be applied to the measured depth to achieve more accurate depth information. Depth correction algorithms, for example, may account for length variations due to pipe stretch or compression due to temperature, weight-on-bit, wellbore curvature and direction. By monitoring or repeatedly measuring block height, as well as lengths of equipment that is added to the drill string 20 while drilling deeper into the formation over time, pairs of time and depth information are created that allow estimation of the depth of the borehole 26 or any location on the drill string 20 at any given time during a monitoring period. Interpolation schemes may be used when depth information is required at a time between actual measurements. Such devices and techniques for monitoring depth information by a surface depth tracking system are known in the art and therefore are not described in detail herein.

The surface control unit 40 displays desired drilling parameters and other information on a display/monitor 42 for use by an operator at the rig site to control the drilling operations. The surface control unit 40 contains a computer that may comprise memory for storing data, computer programs, models and algorithms accessible to a processor in the computer, a recorder, such as tape unit, memory unit, etc. for recording data and other peripherals. The surface control unit 40 also may include simulation models for use by the computer to process data according to programmed instructions. The control unit responds to user commands entered through a suitable device, such as a keyboard. The surface control unit 40 can output certain information through an output device, such as s display, a printer, an acoustic output, etc., as will be appreciated by those of skill in the art. The surface control unit 40 is adapted to activate alarms 44 when certain unsafe or undesirable operating conditions occur.

The drilling assembly 90 may also contain other sensors and devices or tools for providing a variety of measurements relating to the earth formation 60 surrounding the borehole 26 and for drilling the borehole 26 along a desired path. Such devices may include a device for measuring formation properties, such as the formation resistivity or the formation gamma ray intensity around the borehole 26, near and/or in front of the disintegrating tool 50 and devices for determining the inclination, azimuth and/or position of the drill string. A logging-while-drilling (LWD) device for measuring formation properties, such as a formation resistivity tool 64 or a gamma ray device 76 for measuring the formation gamma ray intensity, made according an embodiment described herein may be coupled to the drill string 20 including the drilling assembly 90 at any suitable location. For example, coupling can be done above a lower kick-off subassembly 62 for estimating or determining the resistivity of the earth formation 60 around the drill string 20 including the drilling assembly 90. Another location may be near or in front of the disintegrating tool 50, or at other suitable locations. A directional survey tool 74 that may comprise means to determine the direction of the drilling assembly 90 with respect to a reference direction (e.g., magnetic north, vertical up or down direction, etc.), such as a magnetometer, gravimeter/accelerometer, gyroscope, etc. may be suitably placed for determining the direction of the drilling assembly, such as the inclination, the azimuth, and/or the toolface of the drilling assembly. Any suitable direction survey tool may be utilized. For example, the directional survey tool 74 may utilize a gravimeter (accelerometer), a magnetometer, or a gyroscopic device to determine the drill string direction (e.g., inclination, azimuth, and/or toolface). Such devices are known in the art and therefore are not described in detail herein.

Direction of the drilling assembly may be monitored or repeatedly determined to allow for, in conjunction with depth measurements as described above, the determination of a wellbore trajectory in a three-dimensional space. In the above-described example configuration, the drilling motor 55 transfers power to the disintegrating tool 50 via a shaft (not shown), such as a hollow shaft, that also enables the drilling fluid 31 to pass from the drilling motor 55 to the disintegrating tool 50. In alternative embodiments, one or more of the parts described above may appear in a different order, or may be omitted from the equipment described above.

Still referring to FIG. 1, other LWD devices (generally denoted herein by numeral 77), such as devices for measuring rock properties or fluid properties, such as, but not limited to, porosity, permeability, density, salt saturation, viscosity, permittivity, sound speed, etc. may be placed at suitable locations in the drilling assembly 90 for providing information useful for evaluating the earth formation 60 (i.e., subsurface formation) or fluids along borehole 26. Such devices may include, but are not limited to, acoustic tools, nuclear tools, nuclear magnetic resonance tools, permittivity tools, and formation testing and sampling tools.

The above-noted devices may store data to a memory downhole and/or transmit data to a downhole telemetry system 72, which in turn transmits the received data uphole to the surface control unit 40. The downhole telemetry system 72 may also receive signals and data from the surface control unit 40 and may transmit such received signals and data to the appropriate downhole devices. In one aspect, a mud pulse telemetry system (including a mud pulser) may be used to communicate data between the downhole sensors 70 and devices and the surface equipment during drilling operations. A sensor 43 placed in the fluid line 38 may detect the mud pressure variations, such as mud pulses responsive to the data transmitted by the downhole telemetry system 72. Sensor 43 may generate signals (e.g., electrical signals) in response to the mud pressure variations and may transmit such signals via a conductor 45 or wirelessly to the surface control unit 40. In other aspects, any other suitable telemetry system may be used for one-way or two-way data communication between the surface and the drilling assembly 90, including but not limited to, a wireless telemetry system, such as an acoustic telemetry system, an electro-magnetic telemetry system, a wired pipe, or any combination thereof. The data communication system may utilize repeaters in the drill string or the wellbore. One or more wired pipes may be made up by joining drill pipe sections, wherein each pipe section includes a data communication link that runs along the pipe. The data connection between the pipe sections may be made by any suitable method, including but not limited to, electrical or optical line connections, including optical, induction, capacitive or resonant coupling methods. A data communication link may also be run along a side of the drill string 20, for example, if coiled tubing is employed.

The drilling system described thus far relates to those drilling systems that utilize a drill pipe to convey the drilling assembly 90 into the borehole 26, wherein the weight-on-bit is controlled from the surface, typically by controlling the operation of the drawworks. However, a large number of the current drilling systems, especially for drilling highly deviated and horizontal wellbores, utilize coiled-tubing for conveying the drilling assembly subsurface. In such application a thruster is sometimes deployed in the drill string to provide the desired force on the disintegrating tool 50. Also, when coiled-tubing is utilized, the tubing is not rotated by a rotary table but instead it is injected into the wellbore by a suitable injector while a downhole motor, such as drilling motor 55, rotates the disintegrating tool 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

Liner drilling or casing drilling can be one configuration or operation used for providing a disintegrating device that becomes more and more attractive in the oil and gas industry as it has several advantages compared to conventional drilling. One example of such configuration is shown and described in commonly owned U.S. Pat. No. 9,004,195, entitled "Apparatus and Method for Drilling a Wellbore, Setting a Liner and Cementing the Wellbore During a Single Trip," which is incorporated herein by reference in its entirety. Importantly, despite a relatively low rate of penetration, the time of getting a liner to target is reduced because the liner is run in-hole while drilling the wellbore simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

One or more sensors of the systems may be configured to sense amplitudes of vibrations or oscillations over time may be disposed on the drill string or the BHA. In one or more embodiments, one or more of the sensors may be disposed near the drill bit or disintegrating device so as to sense vibrations or oscillations at a point of excitation of the drill string. The drill bit may be considered a point of excitation due to interaction of the drill bit with a formation rock as the formation rock is being drilled. Alternatively, or in addition thereto, one or more sensors may be configured to sense torque. Sensed data from the one or more sensors may be transmitted to a surface receiver or a surface computer processing system for processing. Alternatively, or in addition thereto, sensor data may be processed downhole by downhole electronics, which may also provide an interface with a telemetry system.

The one or more sensors may be located in a drilling dynamics tool, preferably located close to the bit, but may be located at any position in or along the BHA. The drilling dynamic tool is designed to sample drilling dynamics data at a high timely resolution (e.g., 1000 Hz and faster). The BHA may comprise more than one drilling dynamics tool allowing for observation and/or monitoring of drilling dynamics data at different locations in or along the BHA. Such drilling dynamics data may include, without limitation, acceleration (lateral, axial, tangential), bending moment (torque), temperature, pressure, variation in earth magnetic field, weight on bit, and revolutions per minute. In some embodiments described herein, the sensors used to sample drilling dynamics may be stand-alone sensors located somewhere on or in the BHA, independent of a drilling dynamics tool.

Although FIG. 1 is shown and described with respect to a drilling operation, those of skill in the art will appreciate that similar configurations, albeit with different components, can be used for performing different subsurface operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired subsurface operation(s).

In current systems, as noted above, during drilling operations, it may be difficult to accurately determine and/or estimate vibrations of downhole elements (e.g., BHA, string, etc.). However, knowing or accurately estimating vibrations may be important to ensure efficient drilling operations and/or to prevent damage to downhole components. As discussed, one variable is based on uncertainty based on sensor position. Advantageously, embodiments provided herein are directed to systems and methods for estimating downhole vibrations that are independent of sensor position, thus eliminating the uncertainty based thereon.

Embodiments provided herein provide an implementation for high frequency torsional oscillations (HFTO). In accordance with embodiments of the present disclosure, a representative HFTO value is derived that is independent of the measurement position. Analytical models are then employed, using the representative value, to obtain an estimation of a representative (e.g., maximum) value of vibration amplitudes that is occurring along the BHA or drilling system. Analytical models, in accordance with some embodiments, can be derived for a simple homogeneous geometry for the downhole tool, BHA, and/or drill string.

Turning now to FIGS. 2A-2B, an example of a downhole system 200 and corresponding vibration modes (oscillation modes) are shown. In FIGS. 2A-2B, the oscillation is a torsional oscillation, the torsional oscillation having an angular natural frequency. Torsional oscillation is an oscillatory movement of portions of a downhole tool around the longitudinal axis of the downhole tool. Torsional oscillations are associated to angular displacement, angular velocity, angular acceleration, and angular torque. An angle, as referred to with respect to the preceding, is an angle around the longitudinal axis of the downhole tool. FIG. 2A is a schematic plot of a downhole system illustrating a shape of a downhole system as a function of distance-from-bit, and FIG. 2B illustrates example corresponding torsional oscillation mode shapes that may be excited during operation of the downhole system of FIG. 2A.

Torsional oscillations can be observed by observing the torsional acceleration caused by the torsional oscillation. To measure torsional acceleration, acceleration sensors are used (e.g., accelerometers, inertia sensors, etc.). The angular torque caused by an exciting force acting on the downhole system can be measured by a torque sensor. In downhole applications, for example, strain gauges are typically employed, with such strain gauges using magnetostriction, piezo electricity, optic, induction, or capacitance effects to observe strain caused by the angular torque. The acceleration or torque sensor may be located in, on, or along the downhole system. For example, an acceleration or torque sensor may be installed in the collar of a downhole tool (e.g., inside a cavity closed by a hatch cover), at a surface of the downhole tool, or within the inner bore of a downhole tool (e.g., in a probe container located within the inner bore of the downhole tool through which the drilling fluid is passing from the mud pump at the surface to the disintegrating device).

As illustratively shown in FIG. 2A, the downhole system 200 has various components with different diameters (along with differing masses, densities, material properties, configurations, etc.) and thus during rotation of the downhole system 200, different components may cause various torsional oscillation modes to be generated. The illustrative modes indicate where the highest acceleration amplitudes will exist for different mode shapes. For example, as shown in FIG. 2B, a first torsional oscillation mode shape 202, a second torsional oscillation mode shape 204, and a third torsional oscillation mode shape 206 of the downhole system 200 are shown. The mode shape provides the distribution of the amplitude of torsional acceleration along the BHA, also referred to as torsional load. The torsional load at higher frequencies are named high frequency torsional loads (HFTO). The load distribution (in FIG. 2B, the torsional acceleration) along a downhole system, as shown by the torsional acceleration mode shapes 202, 204, 206, may vary based on the placement of various components along the system.

In accordance with embodiments of the present disclosure, the distribution of the load along a downhole system (e.g., BHA, drill string, etc.) may be represented by the distance from bit, and may be illustratively represented by trigonometric functions (e.g., sine and cosine) with different wavelength, as shown in FIG. 2B. As used herein, a measured angular acceleration is represented as $\ddot{\varphi}_{s,t}(x)$ and a measured dynamic torsional torque is $M_{t,i}(x)$, each as a function of distance from bit x, for every mode/mode shape, and the measured vibration is equal to the sum of all modes i=1 . . . N. It is noted that the measurements may be made by one or more appropriate sensors (e.g., acceleration sensors, torque sensors, etc.) located at a distance from bit x along the downhole system 200. However, as noted, the location of the sensor (distance from bit x) will impact the information obtained by the specific sensor.

Embodiments provided herein take advantage of the fact that the dynamic torsional torque $M_{t,i}(x)$ is proportional to the first derivate of the angular displacement $\varphi_{s,i}(x)$ with respect to the distance from bit x:

$$M_{t,i} = \frac{d\varphi_{s,i}}{dx} GI \quad (1a)$$

In equation (1a), I is the second moment of area (see, e.g., equation (8) below) and G the shear modulus. Further, a harmonic angular acceleration (vibration) versus the time t is represented as:

$$\ddot{\varphi}_{s,i}(x,t) = \omega_{0,i}^2 \cdot \omega_{s,i}(x) \cdot \sin(\omega_{0,i} t + \Phi_i) \quad (1b)$$

In equation (1b), $\omega_{0,i}$ is the angular natural frequency and $\Phi_i$ is the phase shift.

Along the distance from bit x, three scenarios can occur for an analytical model for different measurement positions. With reference again to FIGS. 2A-2B, a first measurement position 208, a second measurement position 210, and a third measurement position 212 are shown, with respective mode shapes at the specific distance from bit x. For example, at the first measurement position 208, zero angular acceleration is measured and a maximum dynamic torsional torque would be measured, as appreciated by those of skill in the art, for the first mode shape 202. At the second position 210, for example, a maximum angular acceleration amplitude is measured for the first mode shape 202, but zero dynamic torsional torque would be present. Finally, at the third position 212, for example, a general case may exist, wherein some amount angular acceleration would be measured and some amount of dynamic torsional torque would be measured for the first mode shape 202.

In each of these cases at least one measured load (e.g., angular acceleration or dynamic torsional torque) is significantly lower than the maximum occurring along the downhole system 200. That is, no case or distance from bit x exists where zero angular acceleration and zero dynamic torque are simultaneously measured. The distribution of the angular acceleration amplitude along the distance from bit x and the dynamic torsional torque amplitude along the distance from bit x is orthogonal to each other. That is, if normalized to a maximum of angular acceleration or dynamic torsional torque, an approximation of the vector sum of both loads is equal to 1 for every distance from bit x (if a constant diameter and other constant characteristics are given).

Knowing this, a relationship between the angular acceleration and the dynamic torsional torque may be established that enables an accurate estimation of downhole vibrations. Further, as described below, the distance from bit x can be eliminated as a variable for the estimation, and thus the placement of one or more sensors can be optimized based on system configurations, and not dependent on specific mathematics or desired accuracy of estimations.

In a model of a torsional oscillator being a tube or similar structure, the characteristics of torsional oscillator may be as follows: outer diameter $D_o$, inner diameter $D_i$, length L, density ρ, Young's Modulus E, and shear modulus G. In the below description of the model torsional oscillator, the boundary conditions on both sides/ends are free. In this example, the results of the torsional oscillation model (e.g., graphical user interface employed by operator to adjust drilling operations) are calculated using a finite element model and are compared with an analytical model. The following discussion will analyze a torsional oscillator model instead of a whole BHA for the sake of simplicity and also because the analytical analysis of a BHA might be unfeasible due to non-homogeneity. The analysis takes into consideration all results given by a graphical user interface that an operator may be using to estimate downhole vibrations and making decisions therefrom. For example, a graphical user interface may provide oscillation frequencies and critical slope values as well as the oscillation mode shapes, the torsional torques, and the angular accelerations.

As used herein, a mode shape i of the angular displacement $\varphi_i$ is as follows, with rank of the mode shape i sorted by angular natural frequency, downhole system or tool length L, and distance from bit x:

$$\varphi_i = \cos\left(\frac{\pi}{L} i x\right) \quad (2)$$

The mass normalized mode shape $\bar{\varphi}_i$ is as follows, with density ρ of the downhole system/tool, tool outer diameter $D_o$, and tool inner diameter $D_i$:

$$\bar{\varphi}_i = \frac{8}{\sqrt{\pi \rho L (D_o^4 - D_i^4)}} \cos\left(\frac{\pi}{L} i x\right) \quad (3)$$

The frequency f of a given mode shape i is:

$$f_{0,i} = \frac{\omega_{0,i}}{2\pi} = \frac{i}{2L}\sqrt{\frac{G}{\rho}} \quad (4)$$

The angular frequency $\omega_{0,i}$ of a given mode shape i is as follows, with shear modulus G:

$$\omega_{0,i} = \frac{\pi}{L} i \sqrt{\frac{G}{\rho}} \quad (5)$$

A critical slope value $S_{c,i}$ is:

$$S_{c,i} = -\tfrac{1}{32}\pi^2 i D_i \sqrt{G\rho}(D_o^4 - D_i^4) \quad (6)$$

A tangential torque $M_t$ is:

$$M_{t,i} = \frac{d\bar{\varphi}_{s,i}}{dx} GI \quad (7)$$

In equation (7) (and equation (1a) above), the second moment of area I is expressed as:

$$I = \frac{\pi}{32}(D_o^4 - D_i^4) \quad (8)$$

It is assumed that the angular velocity at the bit at the angular frequency $\omega_{0,i}$ is equal to the average bit angular velocity (RPM) divided by $\omega_{0,i}$:

$$\hat{\varphi}_{S,i} = \frac{2\pi}{60}RPM\frac{1}{\omega_{0,i}} = \frac{2\pi}{60}RPM\frac{L}{i\pi}\sqrt{\frac{\rho}{G}} \quad (9)$$

In equation (9), $\hat{\varphi}_{s,i}$ is the peak value of the angular deflection corresponding to the mode shape i. As such, the scaled angular deflection $\overline{\varphi}_{s,i}$, with respect to the distance from bit x, can be expressed as:

$$\overline{\varphi}_{s,i} = \hat{\varphi}_{S,i}\cos\left(\frac{\pi}{L}ix\right) = \frac{2\pi}{60}RPM\frac{L}{i\pi}\sqrt{\frac{\rho}{G}}\cos\left(\frac{\pi}{L}ix\right) \quad (10)$$

Consequently, the first derivation of the scaled angular deflection $\overline{\varphi}_{s,i}$ is:

$$\frac{d\overline{\varphi}_{s,i}}{dx} = -\frac{2\pi}{60}RPM\sqrt{\frac{\rho}{G}}\sin\left(\frac{\pi}{L}ix\right) \quad (11)$$

Thus, the torsional torque is $M_{t,i}$ is:

$$M_{t,i} = -\frac{2\pi}{60}RPM\sqrt{\frac{\rho}{G}}\,G\frac{\pi}{32}(D_o^4 - D_i^4)\sin\left(\frac{\pi}{L}ix\right) \quad (12)$$

or $$M_{t,i} = -\frac{\pi^2}{960}RPM(D_o^4 - D_i^4)\sqrt{\rho G}\sin\left(\frac{\pi}{L}ix\right) \quad (13)$$

Further, angular accelerations $A_a$ is:

$$A_{a,i} = \frac{d^2\overline{\varphi}_{s,i}}{dt^2} = \ddot{\overline{\varphi}}_{s,i} \quad (14)$$

$$\ddot{\overline{\varphi}}_{s,i} = \omega_{0,i}^2\overline{\varphi}_{s,i} = \omega_{0,i}^2 k\overline{\varphi}_i = \omega_{0,i}^2\frac{2\pi}{60}RPM\frac{1}{\omega}\cos\left(\frac{\pi}{L}ix\right) \quad (15)$$

$$\ddot{\overline{\varphi}}_{s,i} = \omega_{0,i}\frac{2\pi}{60}RPM\cos\left(\frac{\pi}{L}ix\right) \quad (16)$$

Tangential acceleration $A_t$, at a radius r and time t, is:

$$A_{t,i} = r\frac{d^2\overline{\varphi}_{s,i}}{dt^2} = rA_{a,i} \quad (17)$$

$$\ddot{\overline{\varphi}}_{s,i} = \omega_{0,i}^2\overline{\varphi}_{s,i} = \omega_{0,i}^2 k\overline{\varphi}_i = \omega_{0,i}^2\frac{2\pi}{60}RPM\frac{1}{\omega}\cos\left(\frac{\pi}{L}ix\right) \quad (18)$$

$$A_{t,i} = r\omega_{0,i}\frac{2\pi}{60}RPM\cos\left(\frac{\pi}{L}ix\right) \quad (19)$$

Radial accelerations $A_r$, with velocity v, is:

$$A_{r,i} = \frac{v_i^2}{r} \quad (20)$$

$$v_i = r\dot{\overline{\varphi}}_{s,i} = r\omega_{0,i}\overline{\varphi}_{s,i} = r\omega_{0,i}k\overline{\varphi}_i = r\omega_{0,i}\frac{2\pi}{60}RPM\frac{1}{\omega}\cos\left(\frac{\pi}{L}ix\right) \quad (21)$$

$$v_i = r\frac{2\pi}{60}RPM\cos\left(\frac{\pi}{L}ix\right) \quad (22)$$

$$A_{r,i} = r\left(\frac{2\pi}{60}RPM\cos\left(\frac{\pi}{L}ix\right)\right)^2 \quad (23)$$

Using the above equations, and analytical testing and modeling, it has been determined that an accurate estimation of downhole vibrations (e.g., high frequency torsional oscillations, lateral vibrations, axial vibrations, etc.) may be obtained, independent from sensor position relative to a bit. Thus, improved mitigation of downhole vibrations may be achieved based on angular acceleration and torsional torque detection, without the need for additional information.

A ratio of angular acceleration to torsional torque is independent of the actual amplitude and a constant value for a given angular frequency $\omega$ and corresponding mode. Further it is independent of the length L of the drilling system. As such:

$$\frac{\hat{\varphi}}{\hat{M}} = \frac{1}{\frac{1\pi}{\omega_{0,i}32}\sqrt{\rho G}(D_o^4 - D_i^4)} = \omega_{0,i}\cdot K \quad (24)$$

In equation (26), $\hat{\varphi}$ is a peak amplitude of the angular acceleration, $\hat{M}$ is a peak amplitude of the dynamic torsional torque, and $$K = \frac{1}{\frac{\pi}{32}\sqrt{\rho G}(D_o^4 - D_i^4)}.$$

Further, as stated above, because of the orthogonality of angular acceleration and dynamic torsional torque (e.g., sine vs. cosine) with respect to the distance from bit x the following relationship is applicable:

$$\sqrt{\left(\frac{\varphi}{\hat{\varphi}}\right)^2 + \left(\frac{M}{\hat{M}}\right)^2} = 1^2 \quad (25)$$

From the above, i.e., from equations (24) and (25), the following equation (26) can be derived by multiplying with peak amplitude of angular acceleration $\varphi$:

$$\hat{\varphi} = \sqrt{\dot{\varphi}^2 + \left(\frac{\hat{\varphi}}{\hat{M}}\right)^2 M^2} = \sqrt{\dot{\varphi}^2 + \omega_{0,i}^2 K^2 M^2} \quad (26)$$

Although the above has been described with respect to angular acceleration, the same principle and process can be applied to measured vibration within the downhole tool (e.g., BHA and/or drill string).

Moreover, a similar approach can be used to determine the peak dynamic torque amplitude $\hat{M}$:

$$\hat{M} = \sqrt{\left(\frac{M}{\hat{\varphi}}\right)^2 \ddot{\varphi}^2 + M^2} = \sqrt{\frac{1}{\omega_{0,i}^2 K^2} \ddot{\varphi}^2 + M^2} \qquad (29)$$

The above equations were derived from a homogenous structure (or theoretical structure). However, such concepts can be applied to non-homogeneous structures (e.g., real-world BHA, drill string, etc.). Knowing the peak dynamic torsional torque amplitude and the peak angular acceleration, a reasonable estimation of downhole vibration may be obtained, and thus an operator may adjust a drilling operation accordingly. The peak dynamic torque amplitude $\hat{M}$ and the peak amplitude of angular acceleration $\hat{\ddot{\varphi}}$ are representative values in accordance with embodiments of the present disclosure. It is to be noted that the determined peak dynamic torque amplitude $\hat{M}$ as well as the peak amplitude of angular acceleration $\hat{\ddot{\varphi}}$ are independent of the length L of the downhole system and are independent of the position of the load sensors along the longitudinal axis of the downhole system relative to the bit.

Although the above description is based on the sensors being located at the same distance from bit (or even at the same location), such configuration is not required. That is, in some embodiments, the sensors may be located at different positions and/or distances from bit.

In such arrangement, $$\kappa = \frac{\pi i}{L} = \sqrt{\rho/E}\,\omega_i,$$

and the torsional torque is $$M(x+\Delta x) = -\frac{\pi^2}{960} RPM(D_o^4 - D_i^4)\sqrt{\rho G}\sin\left(\frac{\pi}{l}i(x+\Delta x)\right) =$$

$$\hat{M}\sin(\kappa(x+\Delta x)) = \frac{\hat{\ddot{\varphi}}}{\omega_{0,i} K}\sin(\kappa(x+\Delta x)).$$

The torsional torque may be substituted by the angular acceleration measurement with the knowledge of the angular frequency ω and the ratio K. As such, the angular acceleration can be derived to $\ddot{\varphi}(x)=$ $$\omega_{0,i}\frac{2\pi}{60} RPM\cos\left(\frac{\pi}{L}ix\right) = \hat{\ddot{\varphi}}\cos(\kappa x).$$

In this embodiment, a first load sensor (e.g., torque sensor) is placed at a different distance from bit (DfB) x+Δx with respect to the second load sensor(s) (e.g., accelerometers) that are placed at DfB x. With $$\ddot{\varphi}(x) = \hat{\ddot{\varphi}}\cos(\kappa x) \rightarrow \hat{\ddot{\varphi}} = \frac{\ddot{\varphi}(x)}{\cos(\kappa x)}$$

the torque can be derived by $$(x+\Delta x) = \frac{\ddot{\varphi}(x)}{\cos(\kappa x)\omega K}\sin(\kappa(x+\Delta x)) \rightarrow \frac{M(x+\Delta x)}{\frac{\ddot{\varphi}(x)}{\omega K}} =$$

$$\frac{\sin(\kappa(x+\Delta x))}{\cos(\kappa x)} = \frac{\sin(\kappa x)\cos(\kappa\Delta x) + \cos(\kappa x)\sin(\kappa\Delta x)}{\cos(\kappa x)} \rightarrow \frac{M(x+\Delta x)}{\frac{\ddot{\varphi}(x)}{\omega K}} =$$

$$\tan(\kappa x)\cos(\kappa\Delta x) + \sin(\kappa\Delta x) \rightarrow \tan(\kappa x) = \frac{\frac{\omega KM(x+\Delta x)}{\ddot{\varphi}(x)} - \sin(\kappa\Delta x)}{\cos(\kappa\Delta x)} \rightarrow$$

$$x = \text{atan}\left(\frac{\frac{\omega_{0,i} KM(x+\Delta x)}{\ddot{\varphi}(x)} - \sin(\kappa\Delta x)}{\cos(\kappa\Delta x)}\right).$$

Herein, the DfB x of the sensors is unknown and can be calculated. The distance between both sensors Δx is known. The well-known function a tan 2 has to be used because the equation is case sensitive with respect to the signs. The ratio $$\frac{\ddot{\varphi}(x)}{M(x)} = \frac{-32\omega_{0,i}}{\pi(D_o^4 - D_i^4)\sqrt{\rho G}}\frac{\cos(\kappa x)}{\sin(\kappa x)}$$

can be used to calculate the dynamic torque M(x) (which has not been measured and is only known at M(x+Δx)). With the knowledge of the dynamic torque M(x) and the angular acceleration $\ddot{\varphi}(x)$ at one position the same equations as shown above apply to calculate the maximum dynamic torque and maximum angular acceleration:

$$\hat{M} = \sqrt{\left(\frac{\hat{M}}{\hat{\ddot{\varphi}}}\right)^2 \ddot{\varphi}^2 + M^2} = \sqrt{\frac{1}{\omega_{0,i}^2 K^2}\ddot{\varphi}^2 + M^2}$$

$$\hat{\ddot{\varphi}} = \sqrt{\ddot{\varphi}^2 + \left(\frac{\hat{\ddot{\varphi}}}{\hat{M}}\right)^2 M^2} = \sqrt{\ddot{\varphi}^2 + \omega_{0,i}^2 K^2 M^2}$$

A similar approach can be used if two accelerometers or two torque sensors are used that are placed at two different DfB (or any other sensor that is able to measure torsional oscillations). Moreover, the same assumptions are true for other types of vibrations. Furthermore, it is noted and will be appreciated by those of skill in the art, in view of the teachings herein, that the amount of energy in different frequencies of HFTO can be determined by the algorithm presented herein. The values obtained for each or any given frequency may be employed to provide an indicator for formation detection (e.g., for stringers).

Figure 3A:
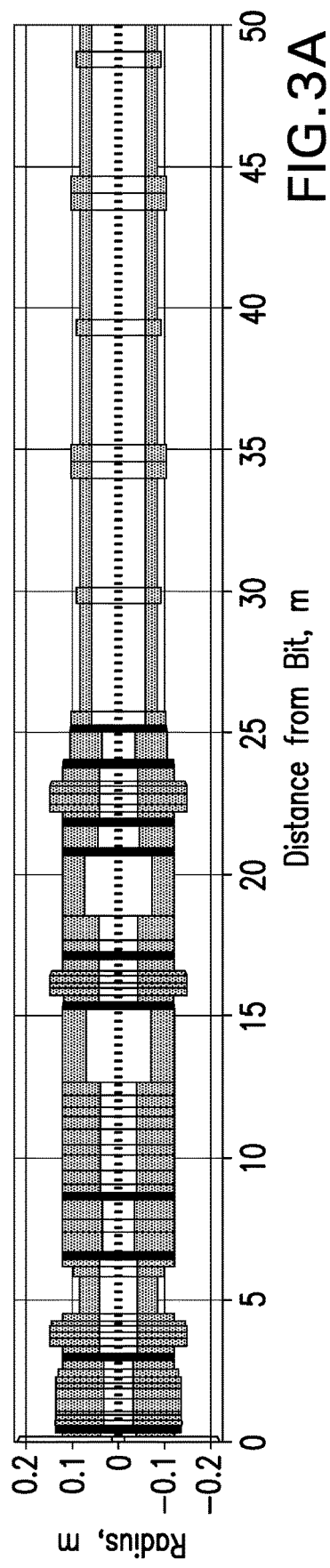
FIG. 3A is a schematic illustration of a downhole system illustrating a shape of the downhole system as a function of distance-from-bit.
Figure 3B:
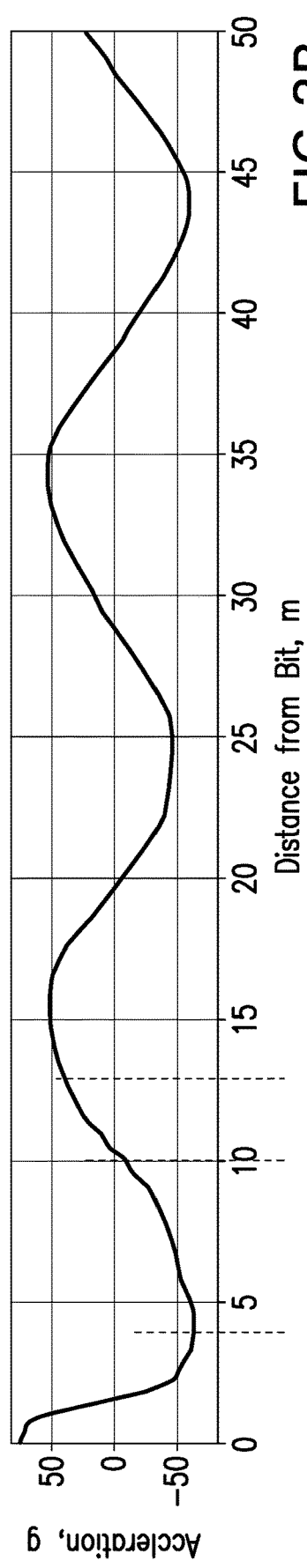
FIG. 3B illustrates an example of dynamic torque corresponding to a vibration mode shape that may be excited during operation of the downhole system of FIG. 3A.
Figure 3C:
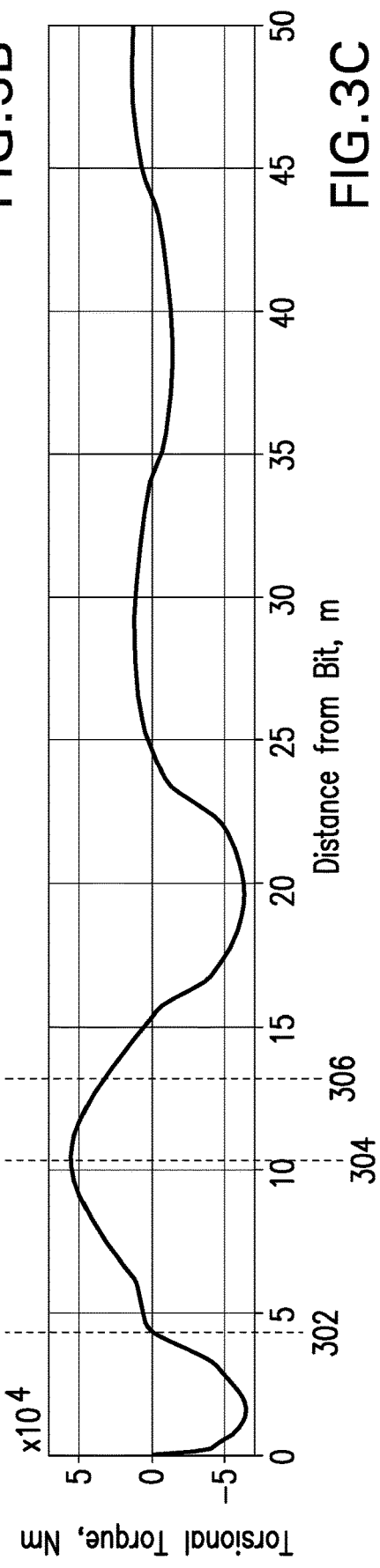
FIG. 3C illustrates an example of dynamic torque corresponding to a mode shape that may be excited during operation of the downhole system of FIG. 3A.

Turning now to FIGS. 3A-3C, an example BHA having a worst-case tangential acceleration amplitude and the worst case dynamic torsional torque is shown. In this example, the reference value is 100 RPM at the bit. Theoretically, the bit RPM scales the worst-case loads linearly, such that loads at 200 RPM are doubled as compared to the loads at 100 RPM. The corresponding mode has a frequency of $f_{0,i}$=142.1 Hz and $\omega_{0,i}=2\pi f_{0,i}$. In this example, point 302 represents a point where zero angular acceleration is measured and maximum dynamic torsional torque is measured; point 304 represents a maximum measurement of angular acceleration amplitude and zero dynamic torque amplitude; and point 306 represents a "general case" having some amount of measured angular acceleration amplitude and dynamic torque amplitude. It is noted that the orthogonality assumption between dynamic torsional torque and tangential acceleration measurement is valid.

A comparison between theoretical worst-case amplitudes for 100 RPM derived with a mathematical model (e.g., a Finite Element Model (dynamic simulation of the downhole string)) and the approach of embodiments provided herein are shown in FIGS. 4A-4F. In each plot, a critical slope value and natural frequency are provided above the plots. The plots are separated into pairs for estimations of angular acceleration and dynamic torsional torque, which can be combined to estimate downhole vibration of the system. Thus enabling an operator to adjust a drilling operation to mitigate the downhole vibration. The calculation of the representative value(s) is done in real time during the drilling operation.

In accordance with some embodiments of the described method and processes, a processor in the downhole tool may be employed and located downhole such that implementation may be executed downhole. In some such embodiments, the determined representative value (e.g., maximum load) may be communicated uphole (e.g., to a surface control unit) and mitigating procedures may be automatically performed. Such automatic mitigation procedures may include, without limitation, changing operational parameters to reduce a determined maximum load in response to the communicated load information exceeding or being equal to a predetermined load limit for a specific downhole tool in the string. Further still, in some embodiments, instead of communicating the representative values to the surface, a downhole processor may communicate information about required operation parameter changes to uphole (e.g., to a surface control unit). In some such embodiments, information about operation parameter changes are received uphole and operation parameter changes may be automatically performed without the interaction of a human being (e.g., operator). Using the downhole processor to perform the calculations in real time while drilling the borehole, the processor needs to know the geometry and material property parameters required to assume the homogeneous structure of the downhole tool (torsional oscillation model).

In accordance with some embodiments, a wire pipe drilling operation provides high bandwidth data transmission. The high bandwidth data transmission may be high enough to transmit the sensor data (e.g., at a high sample rate, such as 1000 Hz or faster) to the surface for uphole or surface data processing. A surface processor (e.g., located in a surface control unit) can perform the described calculations and can provide the representative value(s) to an operator or to an electronic controller that applies a change in operation parameter(s), if required.

In some embodiments, a surface control unit may generate an alert or provide advice or recommendations to an operator based on the transmitted (received) information. As such, the operator may be made aware of the need to take action to reduce vibration downhole. For example, in some embodiments, an alert may be generated when the transmitted information contains a maximum acceleration amplitude or torque amplitude that equals or exceeds a predetermined threshold. Alternatively, in some embodiments, for example, the transmitted information from downhole to uphole may include severity level information. The severity level information may be an indicator indicating that severe downhole vibration is detected (e.g., torsional vibration, axial vibration, lateral vibration). The severity level information may also give information on how severe the vibration is (e.g., indication of acceleration and/or torque amplitudes, vibration frequency). The severity level information may be defined based on the determined acceleration and/or torque amplitudes calculated using embodiments described herein.

In accordance with some embodiments, calculated acceleration or torque data may be stored downhole in a memory in the downhole system. Such stored data may be downloaded after a drilling operation. The calculated data may also be stored uphole in a memory in a surface control unit or any other memory, including the internet or a cloud data system. The calculated data may be used for lifetime determination of the downhole system and for making re-run decisions after retrieving the downhole system from the borehole. The calculated data may also be used for updating threshold acceleration and/or threshold torque data used as preset threshold data for future drilling operations.

Referring again to plots 4A-4F, in each plot, the horizontal axis is distance from bit and, as illustrated, the estimated (analytical) peaks match with the measured peak values, regardless or independent from distance from bit. Accordingly, sensors used in embodiments of the present disclosure can be placed at any given location and will not impact the calculation and/or determination of the downhole vibration. Being independent from distance to the bit refers to more than one location along the downhole system or drill string or more than one distance from the bit in a direction of the longitudinal axis of the downhole system or drill string where a sensor (acceleration and/or torque) can be located and the herein disclosed calculation will be providing the same result (i.e., maximum acceleration or maximum torque).

The measurement loads of torsional oscillation require placement of the sensor(s) in an off-axis position with respect to the longitudinal rotational axis of the downhole tool (longitudinal axis of symmetry). An off-axis position has a radial distance to the longitudinal rotational axis of the downhole tool which is non-zero. The largest radial distance that the torsional load sensor may have from the longitudinal rotation axis of the downhole tool is half of the outer diameter of the downhole tool. Other than the torsional load sensor, an axial load and/or a lateral load sensor can be located on the longitudinal rotational axis of the downhole tool. A radial distance to the longitudinal rotational axis of the downhole tool may be zero or any other value between zero and half of the outer diameter of the downhole tool.

In accordance with the present disclosure, the sensor(s) may be located somewhere in the downhole system at a specific distance to the bit, meaning the sensor may be located at a radius r from the central longitudinal axis of the downhole system and/or may be located a circumferential angle $\varphi$ around the longitudinal axis of the downhole system. A separation distance $\Delta x$ between the acceleration sensor and the torque sensor is measured parallel to the longitudinal axis of the downhole system or drill string, also referred to as an axial distance between the sensors. The acceleration sensor and the torque sensor may also be located at different circumferential angles $\alpha_1$ and $\alpha_2$ at a specific axial location or distance, with an angular separation distance between the sensors. A first load sensor (e.g., an acceleration sensor) and a second load sensor (e.g., a torque sensor) may be located at different radial distances at a specific axial distances, thus having an angular separation distance about the circumference of the downhole string and an axial separation distance along the longitudinal axis of the downhole string. In some embodiments, the two load sensors, may be located or positioned at the same axial distance from the bit (i.e., axial separation distance between sensors is zero) and may have an angular and/or a radial separation distance to each other, which is non-zero. In another example, there may additionally also be an axial separation distance between the sensors which is non-zero. The distance or separation between two sensors may be referred to as a sensor distance, with the sensor distance being axial (i.e., axial separation distance along a string axis) and/or circumferential (i.e., angular separation distance about a string circumference). The sensor distance may be zero in one dimension (e.g., same axial and/or circumferential position) or may be non-zero in both dimensions.

In some non-limiting examples, in accordance with embodiments of the present disclosure, distances for a load sensor from the bit is 1 cm to 30 cm, 30 cm to 50 cm, 50 cm to 1 m, 1 m to 3 m, 3 m to 6 m, 6 m to 10 m, 10 m to 20 m, 20 m to 50 m, or 50 m to 100 m. Example distances between two load sensors, in accordance with embodiments of the present disclosure, are 1 cm to 10 cm, 10 cm to 20 cm, 20 cm to 30 cm, 30 cm to 50 cm, 50 cm to 1 m, 1 m to 5 m, 5 m to 10 m, 10 m to 20 m, or 20 m to 30 m. Example angular distances about a downhole string circumference between two load sensors, in accordance with embodiments of the present disclosure, are 1 degree to 10 degree, 10 degree to 30 degree, 30 degree to 60 degree, 60 degree to 90 degree, 90 degree to 120 degree, 120 degree to 150 degree, or 150 degree to 180 degree.

Figure 4A:
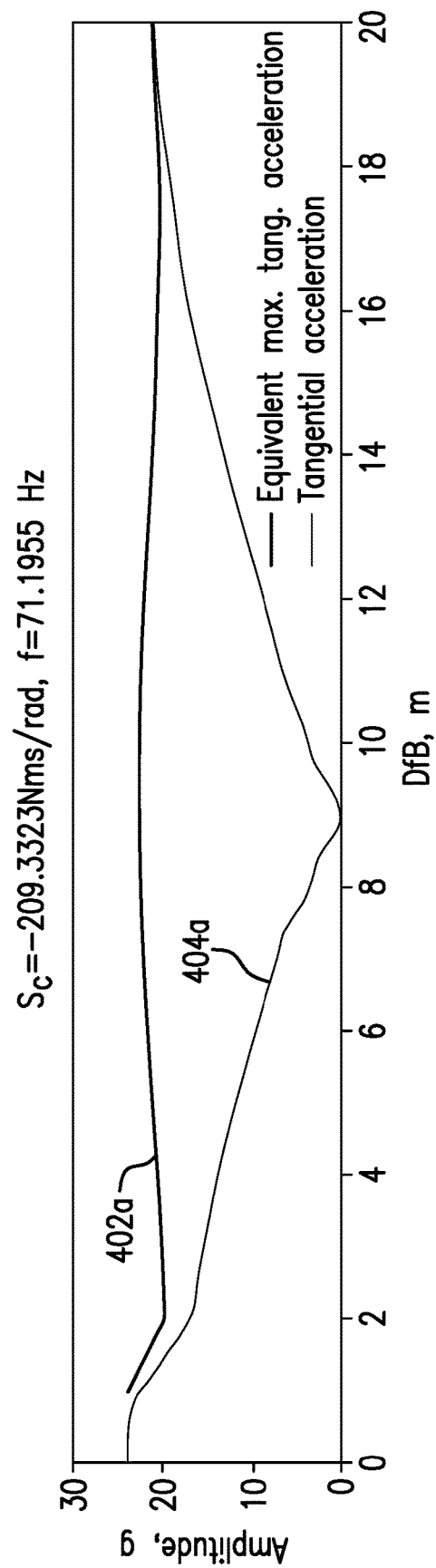
FIG. 4A is a schematic plot illustrating a comparison between the analytical analysis in accordance with an embodiment of the present and an actual acceleration measurement.
Figure 4B:
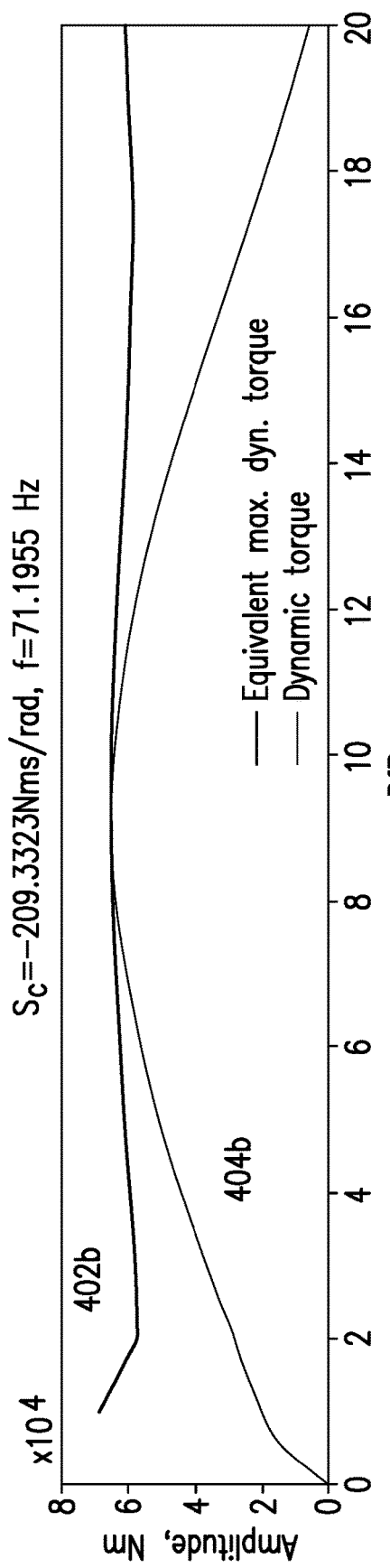
FIG. 4B is a schematic plot illustrating a comparison between the analytical analysis in accordance with an embodiment of the present and an actual torque measurement.

FIG. 4A is a plot illustrating an equivalent maximum tangential acceleration 402a (analytical value) and a tangential acceleration critical mode 404a (measured value) with a stability index of −209.3323 Nms/rad, and a natural frequency of 71.1955 Hz. FIG. 4B is a plot illustrating an equivalent maximum dynamic torque 402b (analytical value) and a dynamic torque critical mode 404b (measured value) with a stability index of −209.3323 Nms/rad, and a natural frequency of 71.1955 Hz.

FIG. 4C is a plot illustrating an equivalent maximum tangential acceleration 402c and a tangential acceleration critical mode 404c with a stability index of −224.0629 Nms/rad, and a natural frequency of 127.4304 Hz FIG. 4D is a plot illustrating an equivalent maximum dynamic torque 402d and a dynamic torque critical mode 404d with a stability index of −224.0629 Nms/rad, and a natural frequency of 127.4304 Hz.

Figure 4E:
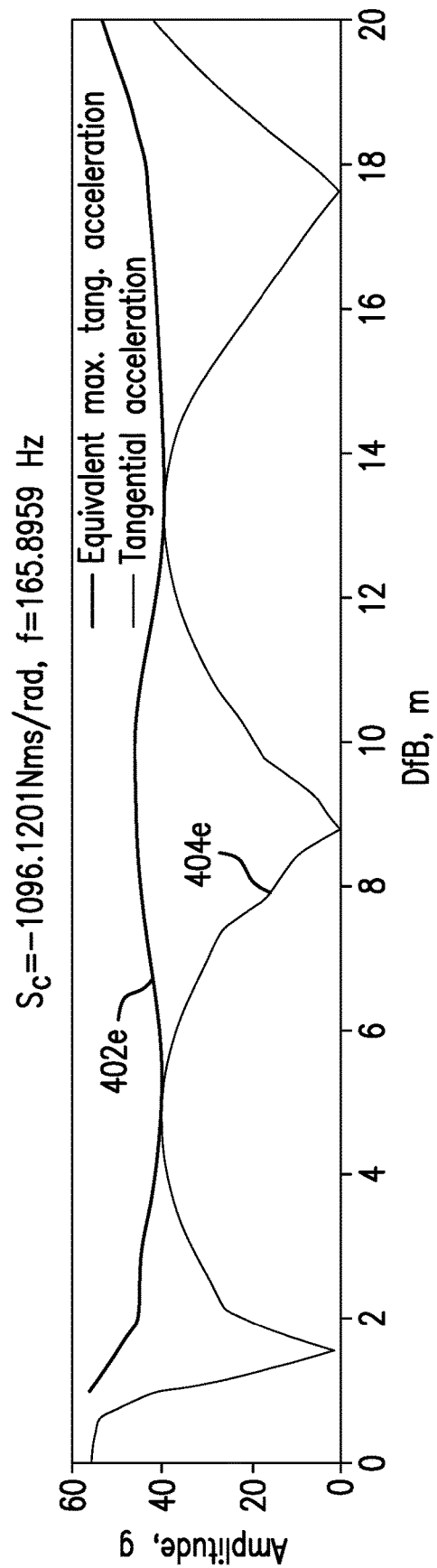
FIG. 4E is a schematic plot illustrating a comparison between the analytical analysis in accordance with an embodiment of the present and an actual acceleration measurement.
Figure 4F:
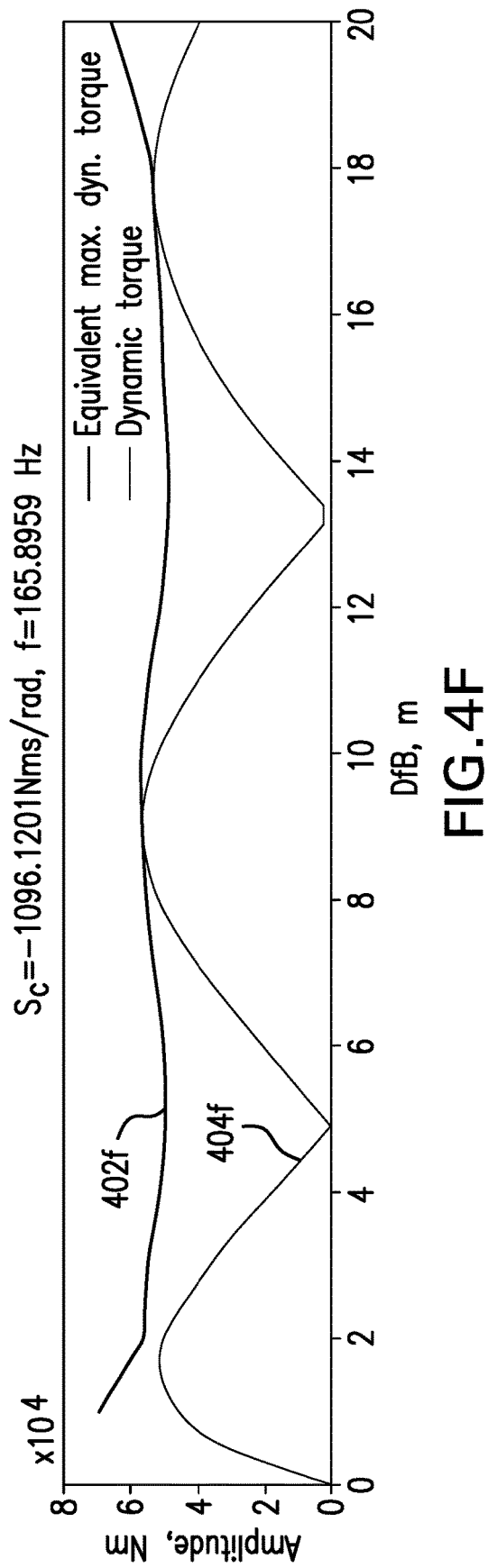
FIG. 4F is a schematic plot illustrating a comparison between the analytical analysis in accordance with an embodiment of the present and an actual torque measurement.

FIG. 4E is a plot illustrating an equivalent maximum tangential acceleration 402e and a tangential acceleration critical mode 404e with a stability index of −1096.1201 Nms/rad, and a natural frequency of 165.8959 Hz. FIG. 4F is a plot illustrating an equivalent maximum dynamic torque 402f and a dynamic torque critical mode 404f with a stability index of −1096.1201 Nms/rad, and a natural frequency of 165.8959 Hz.

The analytical lines 402a, 402b, 402c, 402c, 402d, 402e, 402f illustrate plots of the equivalent maximum load value (e.g., tangential acceleration amplitude or torsional torque amplitude, respectively) derived with the proposed method (e.g., the equations shown and described above). The values are shown for a sensor that is mounted at different distance from bit in meters within the downhole system. As a comparison, the theoretical worst-case amplitudes for 100 RPM are shown are lines 404a, 404b, 404c, 404c, 404d, 404e, 404f for different mode shapes versus the distance from bit. The equivalent maximum load value and the maximum of the theoretical worst-case amplitudes along the downhole tool/BHA/string are nearly similar. As will be appreciated by those of skill in the art, the mathematical equations of the present disclosure may output a constant, single value for each distance from bit that is the highest amplitude along the downhole tool/BHA/string.

Advantageously, employing embodiments of the present disclosure, the maxima of the calculated load values along the downhole tool/BHA/string and the maximum equivalent load values are similar for every sensor position. Thus, as noted above, embodiments provided herein enable vibration estimation and thus enable an operator to adjust a drilling operation to mitigate or minimize downhole vibrations.

Due to the nature of the measurements made in accordance with embodiments of the present disclosure, the amplitude of the measured dynamic torque can be low and the tangential acceleration amplitude can be very high or vice versa (e.g., as shown in FIGS. 3A-3C, points 302, 304). In the frequency information of the tangential acceleration, the amplitude may be very low whereas the maximum tangential acceleration in the BHA can be very high. Using an approach in accordance with the present disclosure, the frequency information may be extracted from the dynamic torsional torque and the tangential acceleration/angular acceleration measurement. From the frequency spectrum, peaks may be determined using a peak detection algorithm. The peaks can be different with respect to the frequency for the dynamic torsional torque and the tangential acceleration measurement at one point, as discussed. Therefore, it is reasonable to calculate the maximum tangential acceleration and maximum dynamic torsional torque for frequencies with high amplitudes in either of the spectra (or all frequencies). From the maximum, as proposed by the algorithm presented herein, an informed decision can be made at which frequency the most critical amplitudes occur. The most critical frequencies and corresponding calculated maximum values can then be presented to a field engineer and be compared to a (tool) limit.

In another example, stick/slip has a very low frequency below 1 Hz (happens on a time scale of 5 s to 10 s) compared to a typical case of HFTO (typically between 20 Hz and 1000 Hz). Stick/slip may lead to a significant increase in the RPM, for example, stick/slip may result in RPM that may be more than double the average RPM. The amplitudes of the dynamic torque and the tangential acceleration are low during the stick phase and very high in the slip phase (high RPM values). From theory the worst-case amplitude is linearly scaled by the RPM. Therefore, stick/slip can lead to a significant increase of the worst-case amplitudes of HFTO that can also be found in measurements. The worst-case amplitude only occurs in a small time interval in one period of the stick/slip cycle where the highest RPM is reached. The averaging effect of the Fourier analysis/FFT to extract the frequency information of the amplitudes is well known. That is a FFT would only lead to an average amplitude of tangential acceleration or dynamic torsional torque with respect to the stick/slip cycle and the interval of the FFT. The peak amplitudes are not detected and represented in the derived frequency spectrum if the time interval is too long in comparison to the time where the maximum amplitudes (with respect to time) occur. Therefore, the time resolution has to be chosen to capture the maximum HFTO amplitudes during a modulation with stick/slip. The application of tapering functions (e.g., Hanning Window) improves the extraction of frequency information from the analyzed measurement data time interval (sample time interval). Negative boundary effects on the resulting frequency information may be reduced.

Figure 5:
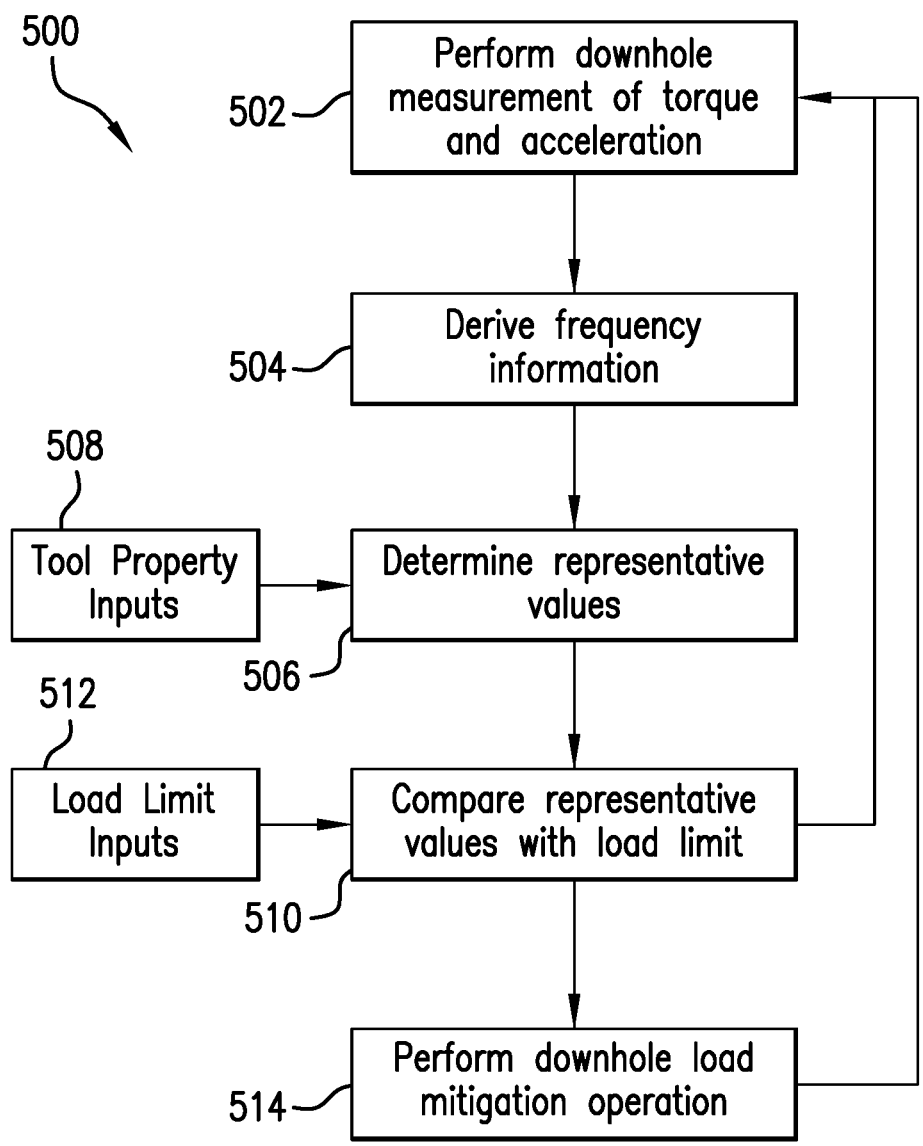
FIG. 5 is a flow process for mitigating downhole loads in accordance with an embodiment of the present disclosure.

Turning now to FIG. 5, a schematic illustration of a flow process 500 in accordance with an embodiment of the present disclosure is shown. The flow process 500 may be performed, in part, for example, using a system similar to that shown in FIG. 1, or variations thereon. Further, the flow process 500 may incorporate aspects of the above described modeling and analytical analysis. Various computations may be performed using one or more processors, located downhole and/or at the surface. Further, one or more sensors may be arranged on a downhole system that may be configured to measure torque and/or acceleration to generate data to be employed in accordance with the above described processes. Advantageously, using the above analytical analysis, the location of the sensors is eliminated as a variable, and thus improved estimation of downhole vibrations and/or loads may be determined. Further, the flow process 500 may be employed to enable mitigation of vibration in a downhole string, as described herein.

The output and/or result of the flow process 500 is the potential reduction of vibration and/or loads that exist during drilling operations. For example, one action an operator can take is a reduction in rotary speed to thus reduce the loads at the bit or near bit. Dominant frequencies and amplitude levels of a given system that implements the flow process 500 may be identified by measurements, as will be appreciated by those of skill in the art. However, as discussed above, to perform the analytical analysis that is independent of sensor position, at least dynamic torsional torque and tangential acceleration are required inputs. A frequency analysis, such as a Fourier analysis (e.g., discrete Fourier transform, fast Fourier transform), may be employed to extract the frequency information of time signals obtained from downhole signals and/or transforms the time-based signal into the frequency domain. For each frequency equivalent dynamic torque and tangential acceleration, values can be determined. The most significant ones are extracted and transmitted to the operator at the surface, and subsequent action can be taken based on the received information (e.g., the sum of amplitudes of different frequencies). In an alternative embodiments, actions may be taken by an automated process, e.g., by the surface control unit or a downhole control unit.

For example, if levels of a given value are observed that exceed a preset threshold, procedures can be initiated to mitigate vibrations or loads by adjusting the operational parameters such as flow rate, rotary speed at the top drive (alternatively at a kelly drive), hook load, weight-on-bit (WOB), mud property, borehole inclination, etc. Preset thresholds may be based on limits that are defined during tool design or developed from experience, historical data, modeling, etc. The measured values (or observed values) may be compared with the preset thresholds, as described below. Using a feedback loop, the effectiveness of the actions taken can be analyzed using the same flow process 500, thus enabling further action that may mitigate vibrations and/or loads downhole. As used herein, loads can include, but are not limited to, angular acceleration, tangential acceleration, angular velocity/deflection, and dynamic torque.

At block 502, the one or more downhole sensors collect data associated with torque and acceleration of the downhole system (e.g., BHA, bit operation, drill string, etc.). The torque measurement may be of dynamic torsional torque and the acceleration measurement may be of tangential acceleration. The dynamic torsional torque measurement may be obtained using one or more strain gauges, as will be appreciated by those of skill in the art. In some embodiments having more than one strain gauge, each strain gauge may be located at a different position along the longitudinal axis of the BHA with a known distance between the strain gauges.

Acceleration measurements are obtained from one or more accelerometers. In some embodiments having more than one accelerometer, each accelerometer may be located at a different position along the longitudinal axis of the BHA with a known distance between the accelerometers. As will be appreciated by those of skill in the art, vibration can be separated by direction into axial, torsional, and lateral accelerations. It is necessary to distinguish between different accelerations directions because different types of vibrations may require different mitigation strategies. Generally, sensor acceleration signals are a superposition of lateral, radial, tangential, and axial accelerations. Axial, torsional, radial, and lateral accelerations are typically derived from sensor signals and sensor positions.

The acceleration of the rotation angle $\varphi$ is called angular acceleration. The angular acceleration $\ddot{\varphi}=\dot{\omega}$ and tangential accelerations $a_T$ are linearly dependent such that $a_T=\ddot{\varphi} r=\dot{\omega} r_{ref}$. Tangential acceleration is caused by an acceleration $\ddot{\varphi}$ of the angle $\varphi$. The tangential acceleration is the corresponding translational acceleration of the sensor in a circumference direction. Tangential accelerations are linearly dependent on a reference radius $r_{ref}$ (e.g., where a sensor is placed). Finally, radial accelerations can be calculated by $a_R=\dot{\varphi}^2 r=\omega^2 r_{ref}$. Similar to the tangential accelerations, radial accelerations are scaled with the reference radius $r_{ref}$. If the sensor is moving on a circular path it is accelerated to the instantaneous center of rotation of the tool because the sensor is fixed to the tool.

Accordingly, at block 502, dynamic torsional torque and acceleration measurements are made.

At block 504, frequency information is derived. For example, a Fourier analysis (e.g., Goertzel algorithm, discrete Fourier transform, fast Fourier transform, etc.) may be used to extract the frequency information of time signals of the drilling system (amplitude versus frequency).

At block 506, representative values for each of the first load and/or the second load may be determined. The representative value may be a maximum load of the respective load measurement. The determination made at block 506 may have various tool property inputs 508 associated with tool and/or system properties. Thus, the representative values may be dependent, in part, upon the system/tool arrangement, and various inputs associated therewith may enable improved accuracy for determining representative values (e.g., active maximum loads during a drilling operation). For example, tool property inputs 508 may include, but are not limited to, geometry, tool size, material properties, etc.

At block 506, for example, for each frequency, an equivalent dynamic torsional torque and an equivalent tangential acceleration may be obtained—e.g., representative value(s). In some embodiments, the most significant values (i.e., maximum) may be extracted using downhole processing and subsequently transmitted to the surface to inform an operator of the representative value(s).

At block 510, the representative value(s) is compared with a respective load limit associated with the system. The comparison may be performed downhole or at the surface, as will be appreciated by those of skill in the art. Block 510 may have an input of load limit inputs 512 (e.g., preset threshold values). In some embodiments, the load limit inputs 512 may be derived from the downhole string/tool/system design specifications. The load limit inputs 512 define amplitudes of loads that are not to be exceeded, and are typically predefined values associated with the tools and/or systems.

At block 510, the system (or an operator) may compare the measured loads (block 506) with the load limits 512, to determine if current loads within a drilling system exceed the load limits 512.

If, at block 510, the measured loads are below the load limits 512, the process may return to block 502 such that a feedback loop is performed and active or actual loads are continuously monitored during a drilling operation.

However, if at block 510, the measured loads meet or exceed the load limits 512, the process 500 may continue to block 514. At block 514, a downhole load mitigation operation may be performed. The downhole load mitigation operation may include, but is not limited to, adjusting flow rates, adjusting rotary speeds of the downhole string, adjusting hook loads, adjusting mud properties, and adjusting weight-on-bit (WOB).

Once the downhole load mitigation operation is performed at block 514, the flow process 500 may return to block 502 in the feedback loop described above. Thus, the results or impact of the downhole load mitigation operation may be determined, and if insufficient to lower the loads below the load limits 512, further downhole load mitigation operations may be performed. Once the active loads are reduced below the load limits 512, the flow process 500 may be looped to monitor downhole loads and indicate if further downhole load mitigation operations should be performed.

Advantageously, embodiments described herein enable calculation of representative values (e.g., maximum loads) without the need of dynamic simulations to determine the vibration modes (e.g., HFTO modes). In accordance with some embodiments of the present disclosure, a portion of the downhole string (e.g., the BHA above the bit or steering unit and below the drill pipes) is assumed to be a nearly homogeneous geometry, allowing to calculate the possible oscillation modes and respective amplitudes analytically. In some embodiments of the present disclosure, the analytical calculation may be transferred into a respective numeric calculation. Using the measurement data of two load sensors measuring two different load parameters provides frequency data and amplitude data of the respective load parameter (e.g., acceleration and torque). Identifying dominant frequencies (natural frequency) and using the load amplitude of the two load parameters at the same dominant frequency provides a representative load amplitude of either one or both load parameters at the dominant frequency. In some embodiments, as discussed above, the two load sensors may be located at the same location (or close to each other) along the longitudinal axis of the BHA. However, as also discussed above, methods for deriving representative load amplitudes with a sensor separation distance Δx that is non-zero are also provided. Further, embodiments described herein are valid for the two load sensors measuring the same load parameter (e.g., two accelerometers or two strain gauges). In such cases, the distance between the two sensors along the longitudinal axis of the downhole string must not be zero (i.e., a non-zero separation distance must be employed). It should be mentioned that it is beneficial to adapt the assumed homogeneous structure of the HBA used for calculation for a portion of the BHA, when in this portion the assumed geometry and/or material properties change, meaning the assumed geometrical parameters and/or the material properties are adapted in the homogeneous model to ensure that the analytical equations deliver the correct results.

Advantageously, embodiments provided herein provide for monitoring downhole loads (e.g., acceleration, torque, vibrations, etc.) without requiring specific placement of sensors. That is, advantageously, embodiments provided herein are directed to monitoring processes that are independent of sensor location. Thus, improved drilling operation efficiencies may be achieved. Further, embodiments provided herein can be used for various types of vibrations, including, but not limited to lateral vibrations, axial vibrations, HFTO, etc.

Advantageously, in accordance with some embodiments, vibrational loads can be derived independently from a measurement position based on the assumption that nearby geometry can be approximated by analytical equations. Typically, for high frequency torsional oscillations the measurement positions is critical with respect to the measured loads. However, embodiments provided herein enable the elimination of the position as a variable/factor, by combining a dynamic torque measurement and a tangential acceleration measurement. Advantageously, embodiments provided herein can be used to reduce non-productive time because misinterpretation of sensors signals is reduced.

Embodiment 1

A method for mitigating vibration in a downhole string, the method comprising: performing a drilling operation using a disintegrating tool on an end of the downhole string; obtaining a first load measurement of a first load during the drilling operation and creating first load measurement data using a first load sensor in the downhole string; obtaining a second load measurement of a second load during the drilling operation and creating second load measurement data using a second load sensor in the downhole string, wherein the second load measurement is different from the first load measurement and the first load sensor and the second load sensor are separated by a sensor distance; determining at least one of (i) a first representative value of the first load along the downhole string from the first load measurement data, the second load measurement data, and the sensor distance and (ii) a second representative value of the second load along the downhole string from the first load measurement data, the second load measurement data, and the sensor distance; comparing the determined representative value(s) against a respective load limit; and performing a vibration mitigation operation in response to the determined representative value(s) equaling or exceeding the respective load limit.

Embodiment 2

The method of the preceding embodiment, wherein the sensor distance is a distance along a longitudinal axis of the downhole string.

Embodiment 3

The method of embodiment 2, wherein the sensor distance is non-zero.

Embodiment 4

The method of embodiment 2, wherein the sensor distance is zero and the first load sensor is separated from the second load sensor by an angular separation about a circumference of the downhole string.

Embodiment 5

The method of any preceding embodiment, wherein at least one of the first representative value and the second representative value is a maximum load value of the respective first and second load along the downhole string.

Embodiment 6

The method of any preceding embodiment, wherein the vibration mitigation operation comprises at least one of adjusting a flow rate, adjusting a rotary speed of the downhole string, adjusting a hook load, adjusting a weight-on-bit, and adjusting a mud property.

Embodiment 7

The method of any preceding embodiment, wherein the first load measurement is a torque measurement.

Embodiment 8

The method of any preceding embodiment, wherein the second load measurement is an acceleration measurement.

Embodiment 9

The method of any preceding embodiment, further comprising transmitting the determined representative value(s) to surface.

Embodiment 10

The method of any preceding embodiment, wherein the respective load limit is determined by using at least one of a dynamic simulation of the downhole string, historical data, and downhole string specification.

Embodiment 11

The method of any preceding embodiment, wherein determining a representative value comprises using an analytical model, the analytical model using at least one downhole string diameter and at least one downhole string material property.

Embodiment 12

The method of any preceding embodiment, further comprising deriving frequency information associated with the drilling operation, wherein the frequency information is used to determine the determined representative value(s).

Embodiment 13

The method of embodiment 12, wherein frequencies with maximum amplitudes are determined from the frequency information of at least one of the first load measurement and the second load measurement.

Embodiment 14

The method of embodiment 12, wherein the frequency information used to determine each representative value is equal.

Embodiment 15

The method of embodiment 12, wherein determining representative value(s) comprises using a frequency analysis.

Embodiment 16

A system for mitigating vibration in a downhole string, the system comprising: a drilling tool at an end of the downhole string and arranged to perform a drilling operation; a first load sensor configured to obtain a first load measurement during the drilling operation and create first load measurement data; a second load sensor configured to obtain a second load measurement during the drilling operation and create second load measurement data, wherein the second load sensor is separate from the first load sensor by a sensor distance; a processor operably connected to the first and second load sensors and configured to: determine at least one of (i) a first representative value of the first load along the downhole string from the first load measurement data, the second load measurement data, and the sensor distance and (ii) a second representative value of the second load along the downhole string from the first load measurement data, the second load measurement data, and the sensor distance; and compare the determined representative value(s) against a respective load limit.

Embodiment 17

The system of embodiment 16, wherein the sensor distance is a distance along a longitudinal axis of the downhole string.

Embodiment 18

The system of embodiment 17, wherein the sensor distance is one of (i) non-zero and (ii) zero with the first load sensor being separated from the second load sensor by an angular separation about a circumference of the downhole string.

Embodiment 19

The system of any preceding embodiment, wherein the first load sensor is a torque sensor and the first load measurement is a torque measurement and the second load sensor is an acceleration sensor and the second load measurement is an acceleration measurement.

Embodiment 20

The system of any preceding embodiment, further comprising a means to transmit the determined representative value(s) to surface.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" or "substantially" used in connection with a quantity is inclusive of the stated value and has the meaning dictated by the context (e.g., it includes the degree of error associated with measurement of the particular quantity). For example, the phrase "substantially constant" is inclusive of minor deviations with respect to a fixed value or direction, as will be readily appreciated by those of skill in the art.

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and I or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for mitigating vibration in a downhole string, the method comprising:
   performing a drilling operation using a disintegrating tool on an end of the downhole string;
   obtaining a first load measurement of a first load during the drilling operation and creating first load measurement data using a first load sensor in the downhole string;
   obtaining a second load measurement of a second load during the drilling operation and creating second load measurement data using a second load sensor in the downhole string, wherein the second load measurement is different from the first load measurement and the first load sensor and the second load sensor are separated by a sensor distance;
   determining at least one of (i) a first representative value of the first load along the downhole string from the first load measurement data, the second load measurement data, and the sensor distance and (ii) a second representative value of the second load along the downhole string from the first load measurement data, the second load measurement data, and the sensor distance;
   comparing the determined representative value(s) against a respective load limit; and
   performing a vibration mitigation operation in response to the determined representative value(s) equaling or exceeding the respective load limit.

2. The method of claim 1, wherein the sensor distance is a distance along a longitudinal axis of the downhole string.

3. The method of claim 2, wherein the sensor distance is non-zero.

4. The method of claim 2, wherein the sensor distance is zero and the first load sensor is separated from the second load sensor by an angular separation about a circumference of the downhole string.

5. The method of claim 1, wherein at least one of the first representative value and the second representative value is a maximum load value of the respective first and second load along the downhole string.

6. The method of claim 1, wherein the vibration mitigation operation comprises at least one of adjusting a flow rate, adjusting a rotary speed of the downhole string, adjusting a hook load, adjusting a weight-on-bit, and adjusting a mud property.

7. The method of claim 1, wherein the first load measurement is a torque measurement.

8. The method of claim 1, wherein the second load measurement is an acceleration measurement.

9. The method of claim 1, further comprising transmitting the determined representative value(s) to surface.

10. The method of claim 1, wherein the respective load limit is determined by using at least one of a dynamic simulation of the downhole string, historical data, and downhole string specification.

11. The method of claim 1, wherein determining a representative value comprises using an analytical model, the analytical model using at least one downhole string diameter and at least one downhole string material property.

12. The method of claim 1, further comprising deriving frequency information associated with the drilling operation, wherein the frequency information is used to determine the determined representative value(s).

13. The method of claim 12, wherein frequencies with maximum amplitudes are determined from the frequency information of at least one of the first load measurement and the second load measurement.

14. The method of claim 12, wherein the frequency information used to determine each representative value is equal.

15. The method of claim 12, wherein determining the representative value(s) comprises using a frequency analysis.

16. A system for mitigating vibration in a downhole string, the system comprising:
- a drilling tool at an end of the downhole string and arranged to perform a drilling operation;
- a first load sensor configured to obtain a first load measurement during the drilling operation and create first load measurement data;
- a second load sensor configured to obtain a second load measurement during the drilling operation and create second load measurement data, wherein the second load sensor is separate from the first load sensor by a sensor distance;
- a processor operably connected to the first and second load sensors and configured to:
  - determine at least one of (i) a first representative value of the first load along the downhole string from the first load measurement data, the second load measurement data, and the sensor distance and (ii) a second representative value of the second load along the downhole string from the first load measurement data, the second load measurement data, and the sensor distance; and
  - compare the determined representative value(s) against a respective load limit.

17. The system of claim 16, wherein the sensor distance is a distance along a longitudinal axis of the downhole string.

18. The system of claim 17, wherein the sensor distance is one of (i) non-zero and (ii) zero with the first load sensor being separated from the second load sensor by an angular separation about a circumference of the downhole string.

19. The system of claim 16, wherein the first load sensor is a torque sensor and the first load measurement is a torque measurement and the second load sensor is an acceleration sensor and the second load measurement is an acceleration measurement.

20. The system of claim 16, further comprising a means to transmit the determined representative value(s) to surface.

\* \* \* \* \*